United States Patent
Nachum et al.

(10) Patent No.: US 7,830,797 B1
(45) Date of Patent: Nov. 9, 2010

(54) PRESERVING PACKET ORDER FOR DATA FLOWS WHEN APPLYING TRAFFIC SHAPERS

(75) Inventors: Youval Nachum, RiShon LeZion (IL); Carmi Arad, Nofit (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 357 days.

(21) Appl. No.: 11/985,478

(22) Filed: Nov. 15, 2007

Related U.S. Application Data

(60) Provisional application No. 60/866,969, filed on Nov. 22, 2006.

(51) Int. Cl.
*G01R 31/08* (2006.01)
(52) U.S. Cl. .................................. 370/230.1
(58) Field of Classification Search .................. 370/229, 370/230, 230.1, 232, 235, 236, 241, 389, 370/392, 474
See application file for complete search history.

(56) References Cited

U.S. PATENT DOCUMENTS

| | | | |
|---|---|---|---|
| 7,065,569 B2 * | 6/2006 | Teraslinna | 709/223 |
| 7,330,430 B2 * | 2/2008 | Lodha | 370/230.1 |
| 2005/0018601 A1 * | 1/2005 | Kalkunte et al. | 370/229 |
| 2005/0111359 A1 * | 5/2005 | Onoe et al. | 370/229 |

OTHER PUBLICATIONS

IEEE P802.1au/D0.1; Draft Standard for Local and Metropolitan Area Networks—Virtual Bridged Local Area Networks—Amendment 7: Congestion Management; Sponsor LAN MAN Standards Committee of the IEEE Computer Society; Prepared by the Interworking Task Group of IEEE 802.1; Sep. 29, 2006; 43 pages.

* cited by examiner

*Primary Examiner*—Kwang B Yao
*Assistant Examiner*—Anh Ngoc Nguyen

(57) ABSTRACT

Apparatus having corresponding methods and computer programs comprise: an ingress circuit to receive a plurality of data flows, wherein each data flow includes packets of data having a desired order of transmission; an unshaped queue; one or more shaped queues; a forwarding engine to transfer the packets in each data flow from the ingress circuit to the unshaped queue when a shaping flag for the respective data flow is not set, and to transfer the packets in each data flow from the ingress circuit to a corresponding shaped queue when the shaping flag for the respective data flow is set; an egress circuit to transmit the packets; and a scheduler to dequeue the packets from the unshaped queue to the egress circuit, and to dequeue the packets from each shaped queue to the egress circuit only when no packets for the respective data flow remain in the unshaped queue.

20 Claims, 6 Drawing Sheets

PRESERVING PACKET ORDER FOR DATA FLOWS WHEN APPLYING TRAFFIC SHAPERS

CROSS-REFERENCE TO RELATED APPLICATIONS

This application claims the benefit of U.S. Provisional Patent Application Ser. No. 60/866,969, filed on Nov. 22, 2006, the disclosure thereof incorporated by reference herein in its entirety.

BACKGROUND

The present disclosure relates generally to data communications. More particularly, the present invention relates to preserving packet order for data flows when applying traffic shapers.

SUMMARY

In general, in one aspect, an embodiment features an apparatus comprising: a first ingress circuit to receive packets of data; an egress circuit to transmit the packets; a second ingress circuit to receive one or more shaping indications each identifying a respective data flow comprising a plurality of the packets; a shaping controller to associate each data flow with a respective shaped queue in response to the respective shaping indication; a flow identification engine to identify the packets received by the first ingress circuit that belong to each of the data flows; a forwarding engine to transfer the packets belonging to each data flow from the first ingress circuit to the associated shaped queue, and to transfer the packets not belonging to any of the data flows from the ingress circuit to an unshaped queue; and a scheduler to dequeue the packets from the unshaped queue to the egress circuit, and to dequeue the packets from each shaped queue to the egress circuit only when no packets for the respective data flow remain in the unshaped queue.

Embodiments of the apparatus can include one or more of the following features. In some embodiments, the packets are dequeued from each shaped queue according to a respective traffic shaping algorithm. In some embodiments, the shaping controller creates one or more of the shaped queues in response to the shaping indications; and wherein the scheduler dequeues packets from each of the one or more shaped queues only after dequeueing any packets present in the unshaped queue when the respective shaped queue was created. Some embodiments comprise a sequence circuit to associate sequence numbers with the packets; wherein the scheduler dequeues the packets from each shaped queue to the egress circuit based on the sequence numbers of the packets in the unshaped queue and the sequence numbers of the packets in the respective shaped queue. In some embodiments, the sequence circuit associates increasing sequence numbers with the packets in arrival order; and the scheduler dequeues packets from each shaped queue only when no packets in the unshaped queue have a sequence number greater than the sequence number of any packet in the shaped queue. In some embodiments, each shaping indication represents congestion of a transmission path of the respective data flow. In some embodiments, the shaping indications comprise at least one of: backward congestion notification (BCN) packets; quantized congestion notification (QCN) packets; endpoint congestion management (ECM) packets; and quantized endpoint congestion management (QECM) packets. In some embodiments, each shaping indication includes at least a portion of one of the packets of data belonging to the respective data flow. Some embodiments comprise network device comprising the apparatus. In some embodiments, the network device is selected from the group consisting of: a network switch; a network bridge; a router; and a network interface card. In some embodiments, the apparatus is compliant with all or part of IEEE standard 802.1.Qau, including draft and approved amendments.

In general, in one aspect, an embodiment features a method comprising: receiving packets of data; receiving one or more shaping indications each identifying a respective data flow comprising a plurality of the packets; associating each data flow with a respective shaped queue in response to the respective shaping indication; identifying the received packets that belong to each of the data flows; transferring the packets belonging to each data flow to the associated shaped queue; transferring the packets not belonging to any of the data flows to an unshaped queue; transmitting the packets from the unshaped queue; and transmitting the packets from each shaped queue only when no packets for the respective data flow remain in the unshaped queue.

Embodiments of the method can include one or more of the following features. In some embodiments, the packets are transmitted from each shaped queue according to a respective traffic shaping algorithm. Some embodiments comprise creating one or more of the shaped queues in response to the shaping indications; and transmitting the packets from each shaped queue only after transmitting any packets present in the unshaped queue when the shaped queue was created. Some embodiments comprise associating sequence numbers with the packets; and transmitting the packets from each shaped queue based on the sequence numbers of the packets in the unshaped queue and the sequence numbers of the packets in the respective shaped queue. In some embodiments, increasing sequence numbers are associated with the packets in arrival order; and the packets are transmitted from each shaped queue only when no packets in the unshaped queue have a sequence number greater than the sequence number of any packet in the shaped queue. In some embodiments, each shaping indication represents congestion of a transmission path of the respective data flow. In some embodiments, the shaping indications comprise at least one of: backward congestion notification (BCN) packets; quantized congestion notification (QCN) packets; endpoint congestion management (ECM) packets; and quantized endpoint congestion management (QECM) packets. In some embodiments, each shaping indication includes at least a portion of one of the packets of data belonging to the respective data flow. In some embodiments, the method is compliant with all or part of IEEE standard 802.1.Qau, including draft and approved amendments.

In general, in one aspect, an embodiment features an apparatus comprising: first ingress means for receiving packets of data; egress means for transmitting the packets; second ingress means for receiving one or more shaping indications each identifying a respective data flow comprising a plurality of the packets; shaping controller means for associating each data flow with a respective shaped queue in response to the respective shaping indication; flow identification means for identifying the packets received by the first ingress means that belong to each of the data flows; forwarding means for transferring the packets belonging to each data flow from the first ingress means to the associated shaped queue, and for transferring the packets not belonging to any of the data flows from the ingress means to an unshaped queue; and scheduler means for dequeueing the packets from the unshaped queue to the egress means, and for dequeueing the packets from each shaped queue to the egress means only when no packets for the respective data flow remain in the unshaped queue.

Embodiments of the apparatus can include one or more of the following features. In some embodiments, the packets are dequeued from each shaped means for queuing according to a respective traffic shaping algorithm. In some embodiments, the shaping controller creates one or more of the shaped queues in response to the shaping indications; and the scheduler means dequeues packets from each of the one or more shaped queues only after dequeueing any packets present in the unshaped queue when the respective shaped queue was created. Some embodiments comprise sequence means for associating sequence numbers with the packets; wherein the scheduler means dequeues the packets from each shaped means for queuing to the egress means based on the sequence numbers of the packets in the unshaped means for queuing and the sequence numbers of the packets in the respective shaped means for queuing. In some embodiments, the sequence means associates increasing sequence numbers with the packets in arrival order; and wherein the scheduler means dequeues packets from each shaped means for queuing only when no packets in the unshaped means for queuing have a sequence number greater than the sequence number of any packet in the shaped means for queuing. In some embodiments, each shaping indication represents congestion of a transmission path of the respective data flow. In some embodiments, the shaping indications comprise at least one of: backward congestion notification (BCN) packets; quantized congestion notification (QCN) packets; endpoint congestion management (ECM) packets; and quantized endpoint congestion management (QECM) packets. In some embodiments, each shaping indication includes at least a portion of one of the packets of data belonging to the respective data flow. Some embodiments comprise a network device comprising the apparatus. In some embodiments, the network device is selected from the group consisting of: a network switch; a network bridge; a router; and a network interface card. In some embodiments, the apparatus is compliant with all or part of IEEE standard 802.1.Qau, including draft and approved amendments.

In general, in one aspect, an embodiment features a computer program executable on a processor, comprising: instructions for associating each data flow with a respective shaped queue in response to a respective shaping indication, wherein each shaping indication identifies a respective data flow comprising a plurality of received packets; instructions for identifying the received packets that belong to each of the data flows; instructions for transferring the packets belonging to each data flow to the associated shaped queue; instructions for transferring the packets not belonging to any of the data flows to an unshaped queue; instructions for causing transmission of the packets from the unshaped queue; and instructions for causing transmission of the packets from each shaped queue only when no packets for the respective data flow remain in the unshaped queue.

Embodiments of the computer program can include one or more of the following features. In some embodiments, the packets are transmitted from each shaped queue according to a respective traffic shaping algorithm. Some embodiments comprise instructions for creating one or more of the shaped queues in response to the shaping indications; and instructions for causing transmission of the packets from each shaped queue only after transmitting any packets present in the unshaped queue when the shaped queue was created. Some embodiments comprise instructions for associating sequence numbers with the packets; and instructions for causing transmission of the packets from each shaped queue based on the sequence numbers of the packets in the unshaped queue and the sequence numbers of the packets in the respective shaped queue. In some embodiments, increasing sequence numbers are associated with the packets in arrival order; and the packets are transmitted from each shaped queue only when no packets in the unshaped queue have a sequence number greater than the sequence number of any packet in the shaped queue. In some embodiments, each shaping indication represents congestion of a transmission path of the respective data flow. In some embodiments, the shaping indications comprise at least one of: backward congestion notification (BCN) packets; quantized congestion notification (QCN) packets; endpoint congestion management (ECM) packets; and quantized endpoint congestion management (QECM) packets. In some embodiments, each shaping indication includes at least a portion of one of the packets of data belonging to the respective data flow. In some embodiments, the computer program is compliant with all or part of IEEE standard 802.1.Qau, including draft and approved amendments.

The details of one or more implementations are set forth in the accompanying drawings and the description below. Other features will be apparent from the description and drawings, and from the claims.

Figure 1:
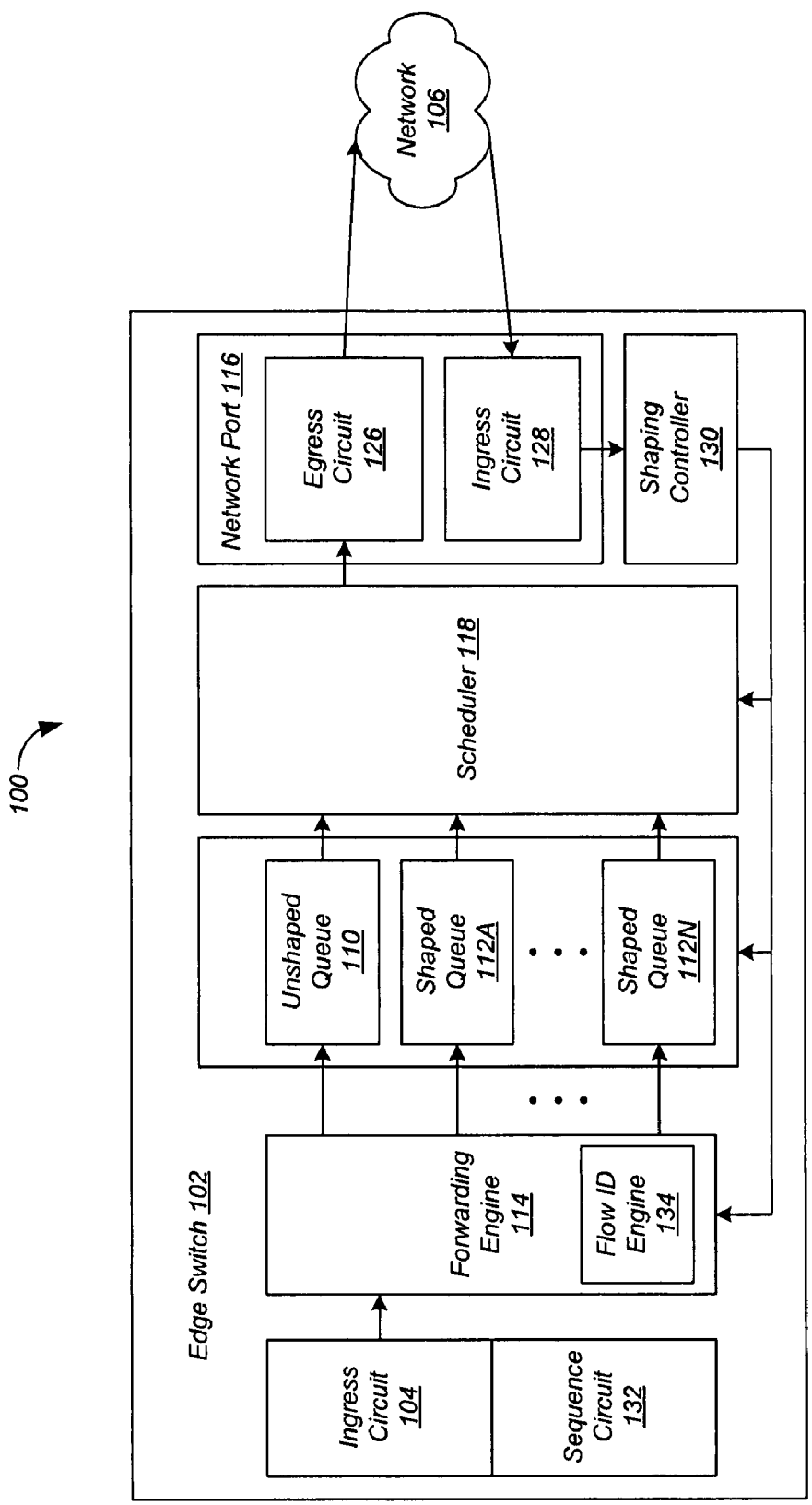
FIG. 1 shows a data communication system including an edge switch in communication with a network according to some embodiments.

The leading digit(s) of each reference numeral used in this specification indicates the number of the drawing in which the reference numeral first appears.

DETAILED DESCRIPTION

Embodiments preserve packet order for data flows when applying traffic shapers. A data flow is a series of packets of data having a desired order of transmission. For example, the packets of data in a data flow can represent voice data, video data, or other types of data where the order of transmission is important. A traffic shaper, which may be referred to herein as a shaped queue, is a mechanism for controlling a transmission rate of packets of data, and generally includes a queue and a rate limiter to control the dequeue rate for the queue. For example, some embodiments include an edge switch for a network. The switch uses an unshaped queue to pass data flows to the network when congestion is low. But when congestion becomes high for a data flow, the switch begins to use a shaped queue for that data flow in order to minimize the loss of packets in the network due to congestion. Embodiments preserve packet order for a data flow when transitioning the data flow from an unshaped queue to a shaped queue, whether necessitated by congestion or other conditions.

FIG. 1 shows a data communication system 100 including an edge switch 102 in communication with a network 106 according to some embodiments. Network 106 can be implemented as a wide-area network such as the Internet, a local-area network (LAN), or the like. The relationship between edge switch 102 and network 106 is not necessarily one-to-one. For example, network 106 can include partitions, sub-networks, and the like. While embodiments are described with respect to network communications, they are equally applicable to devices employing other forms of data communications such as direct links and the like. For example, edge switch 102 can be implemented as a router, a network interface card (NIC), and the like.

Edge switch 102 includes an ingress circuit 104 to receive packets of data to be sent to network 106, an unshaped queue 110 and one or more shaped queues 112A-N to store the packets of data, a forwarding engine 114 to transfer the packets of data from ingress circuit 104 to queues 110, 112, a network port 116 in communication with network 106, and a scheduler 118 to transfer the packets of data from queues 110, 112 to network port 116.

Network port 116 includes an egress circuit 126 to transmit packets of data to network 106, and an ingress circuit 128 to receive packets of data from network 106. Edge switch 102 also includes a shaping controller 130 to identify data flows based on shaping indications received from network 106, and a sequence circuit 132 to assign sequence numbers to packets ingressed by ingress circuit 104. Forwarding engine 114 includes a flow identification engine (Flow ID Engine) 134 to identify packets received by ingress circuit 104 that belong to particular data flows identified by shaping controller 130.

Figure 2:
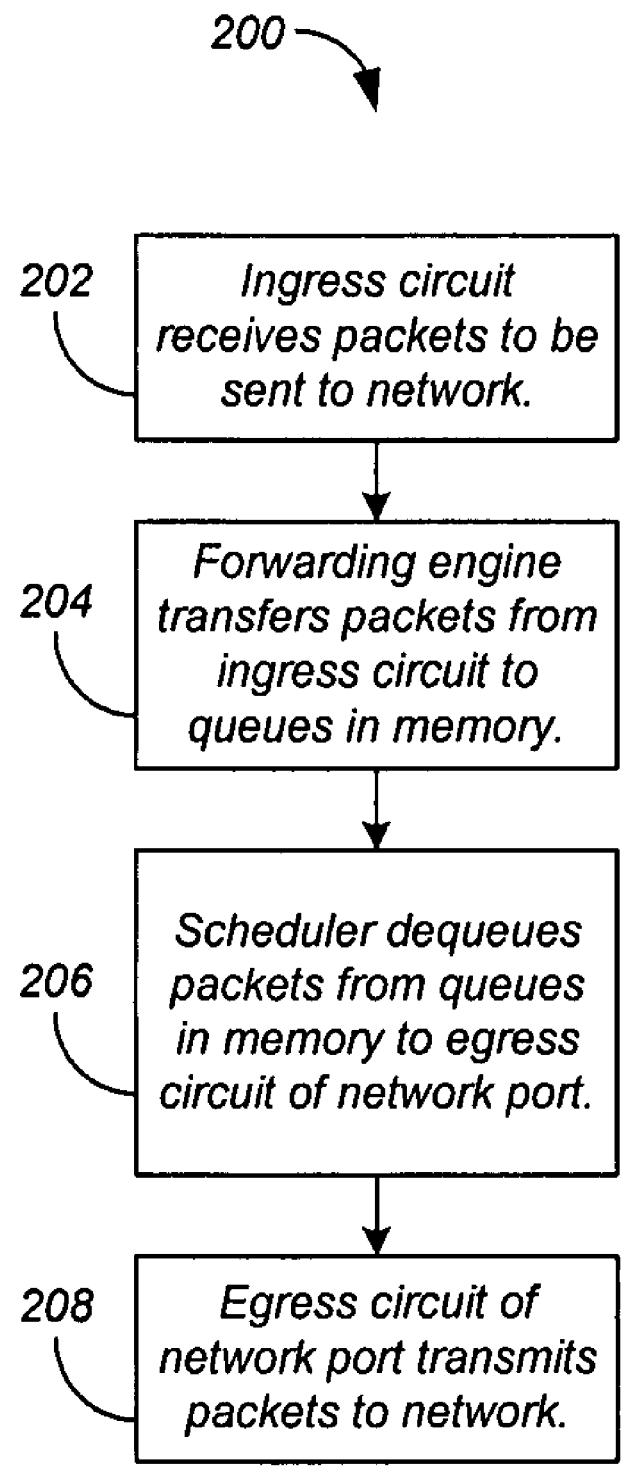
FIG. 2 shows a process for the edge switch of FIG. 1 according to some embodiments.

FIG. 2 shows a switching process 200 for edge switch 102 of FIG. 1 according to some embodiments. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Figure 3:
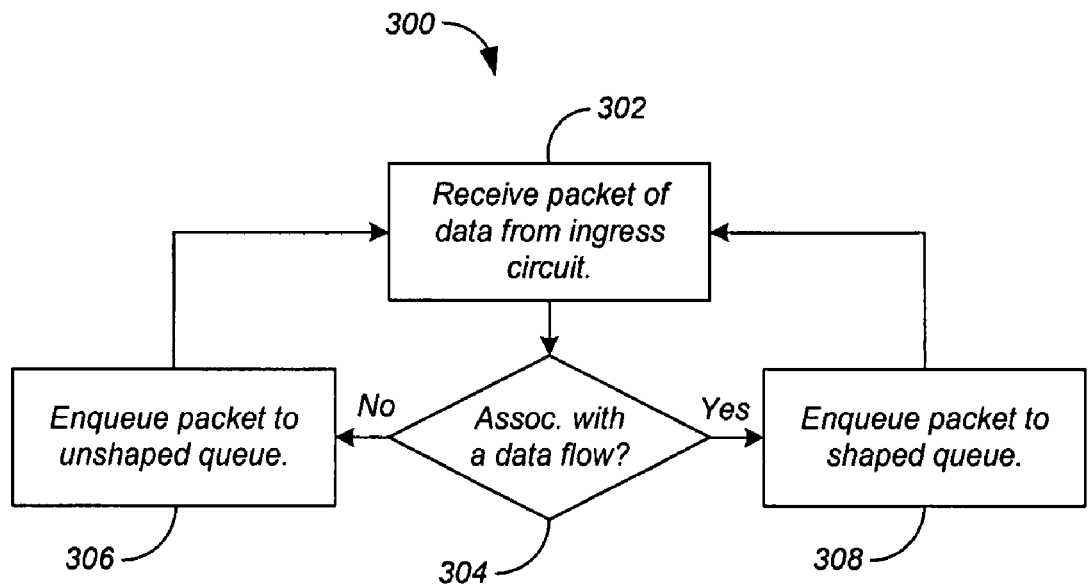
FIG. 3 shows a process for the forwarding engine of the edge switch of FIG. 1 to transfer the packets from ingress circuit to memory according to some embodiments.

Ingress circuit 104 receives packets of data to be sent to network 106 (step 202). Forwarding engine 114 transfers the packets from ingress circuit 104 to queues 110, 112 (step 204). FIG. 3 shows a process 300 for forwarding engine 114 to transfer the packets from ingress circuit 104 to queues 110, 112 according to some embodiments. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

Figure 4:
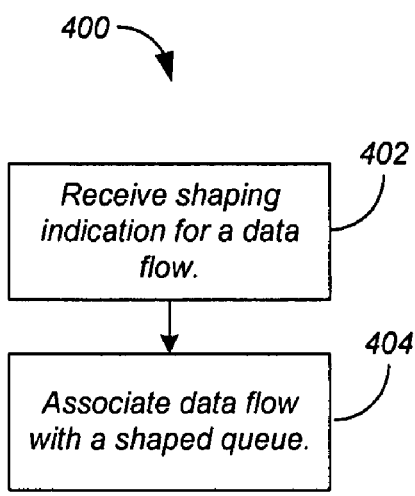
FIG. 4 shows a process 400 for shaping controller 130 of FIG. 1 according to some embodiments.

Referring to FIG. 3, forwarding engine 114 receives a packet of data from ingress circuit 104 (step 302). Flow ID engine of 134 forwarding engine 114 determines whether the packet belongs to a data flow selected by shaping controller 130 (step 304). FIG. 4 shows a process 400 for shaping controller 130 of FIG. 1 according to some embodiments. Although in the described embodiments, the elements of process 400 are presented in one arrangement, other embodiments may feature other arrangements, as will be apparent to one skilled in the relevant arts based on the disclosure and teachings provided herein. For example, in various embodiments, some or all of the steps of process 400 can be executed in a different order, concurrently, and the like.

Referring to FIG. 4, ingress circuit 128 of network port 116 receives a shaping indication from network 106 (step 402). Each shaping indication identifies a data flow that includes packets transmitted by network port 116 to network 106.

In some embodiments, the shaping indication represents congestion in network 106. In some embodiments, the shaping indications include congestion notification packets. For example, a core switch in network 106 detects congestion in a data flow and transmits a congestion notification packet to the source of the data flow. The congestion notification packet can incorporate some or all of a packet in the data flow. Shaping controller 130 uses this information to identify the congested data flow for forwarding engine 114. The congestion notification can be implemented as backward congestion notification (BCN) packets, quantized congestion notification (QCN) packets, endpoint congestion management (ECM) packets, quantized endpoint congestion management (QECM) packets, and the like, although any other suitable mechanism for congestion management can be employed. The use of BCN and QCN packets is documented in emerging IEEE standard 802.1.Qau, the disclosure thereof incorporated by reference in its entirety. In some embodiments, edge switch 102 is compliant with all or part of IEEE standard 802.1.Qau, including draft and approved amendments.

Referring again to FIG. 4, shaping controller 130 associates the data flow identified by the shaping indication with a shaped queue 112 (step 404). In some embodiments, shaping controller 130 associates a data flow with a shaped queue 112 by setting a pointer to the shaped queue 112 in forwarding engine 114. In some cases, a shaping indication is received for a data flow that is already associated with a shaped queue 112. In these cases, the shaped queue 112 can be reconfigured according to the shaping indication, for example by changing the dequeue rate of the shaped queue 112.

Returning to FIG. 3, if the received packet is not associated with a data flow (step 304), forwarding engine 114 enqueues the packet of data to unshaped queue 110 (step 306). Process 300 then returns to step 302. But if the if the received packet is associated with a data flow, forwarding engine 114 enqueues the packet of data to the shaped queue 112 associated with the data flow (step 308). Process 300 then returns to step 302.

In some embodiments, shaped queues 112 are created and released as needed. For example, when no shaped queue 112 is available for association with a data flow identified by a shaping indication, a shaped queue 112 is created for the data flow. Conversely, when a shaped queue is no longer needed for a data flow, the shaped queue 112 for the data flow can be released when empty.

Referring again to FIG. 2, scheduler 118 dequeues the packets of data from queues 110, 112 to egress circuit 126 of network port 116 (step 206), which transmits the packets of data to network 106 (step 208). Scheduler 118 dequeues packets of data from shaped queues 112 using suitable traffic-shaping techniques. However, when a shaped queue 112 is employed for a data flow, scheduler 118 ensures that all packets for that data flow have been dequeued from unshaped queue 110 before dequeueing any packets from the shaped queue 112 for that data flow to preserve packet order in that data flow.

Figure 5:
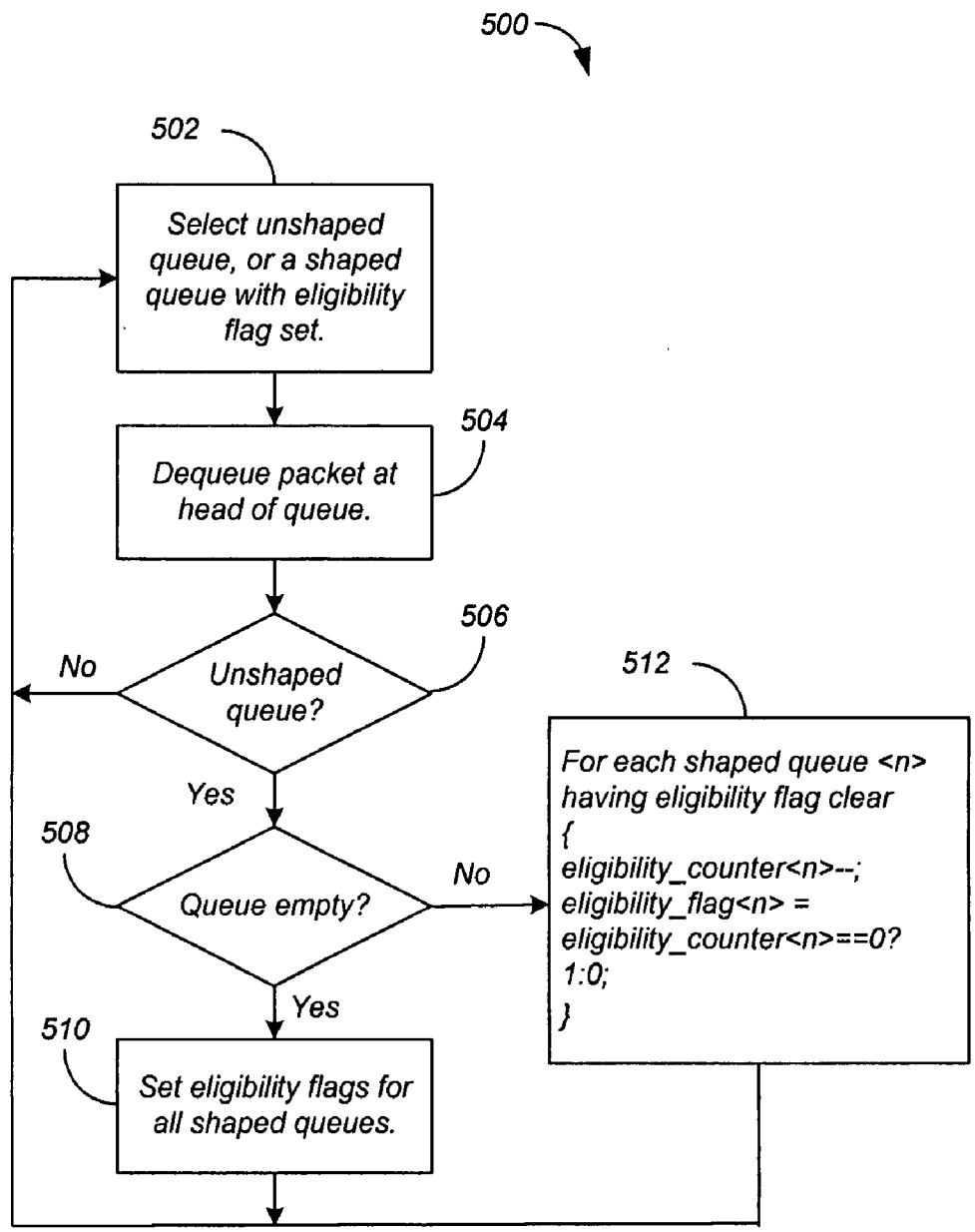
FIG. 5 shows a process for the scheduler of FIG. 1 for dequeueing packets based on the number of packets present in unshaped queue when the respective shaped queue was created according to an embodiment.

FIG. 5 shows a process 500 for scheduler 118 for dequeueing packets based on the number of packets present in unshaped queue 110 when the respective shaped queue 112 was created according to an embodiment. According to process 500, each shaped queue 112 has an eligibility flag and an eligibility counter. When a shaped queue 112 is created, the eligibility flag for the shaped queue 112 is cleared, and the eligibility counter for the shaped queue 112 is initialized to the number of packets present in unshaped queue 110 at that time. If the eligibility counter is set to zero when a shaped queue 112 is created, then the eligibility flag for the shaped queue 112 is set.

Referring to FIG. 5, scheduler 118 selects unshaped queue 110, or a shaped queue 112 having an eligibility flag that is set (step 502). Scheduler 118 can employ any suitable technique to select queues 110, 112. Scheduler 118 then dequeues the packet at the head of the selected queue 110, 112 (step 504). If the selected queue is not unshaped queue 110 (step 506), scheduler 118 selects a queue 110, 112 again (returning to step 502). But if the selected queue is unshaped queue 110 (step 506), scheduler 118 determines whether unshaped queue 110 is empty (step 508).

If unshaped queue 110 is empty, scheduler 118 sets the eligibility flags for all of the unshaped queues 112 (step 510) before selecting another queue 110, 112 (returning to step 502). But if unshaped queue 110 is not empty, for each shaped queue 112 having an eligibility flag that is clear, scheduler 118 decrements the respective eligibility counter, and if the eligibility counter is then zero, sets the eligibility flag (step 512). Process 500 then returns to step 502. In this way, scheduler 118 dequeues packets from each shaped queue 112 only after dequeueing any packets present in unshaped queue 110 when the shaped queue 112 was created, thereby ensuring packets in each data flow are transmitted in order.

Figure 6:
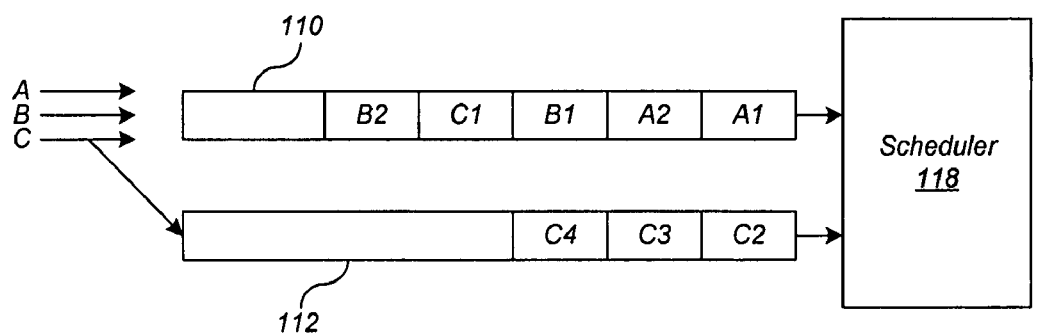
FIG. 6 shows an example operation of the process of FIG. 5 according to an embodiment.

FIG. 6 shows an example operation of process 500 of FIG. 5 according to an embodiment. Referring to FIG. 6, a scheduler 118, an unshaped queue 110 and a shaped queue 112 are shown for three data flows A, B, and C. Unshaped queue 110 contains five packets: two from data flow A (A1, A2), two from data flow B (B1, B2), and one from data flow C (C1). The five packets were enqueued in the order A1, A2, B1, B2, C1. At that time, congestion was detected on the transmission path of data flow C, so the ensuing packets of data flow C were enqueued to shaped queue 112 in the order C2, C3, C4.

In the example of FIG. 6, five packets were present in unshaped queue 110 when shaped queue 112 was created, so N=5 for shaped queue 112. Therefore, scheduler 118 will not dequeue any packets from shaped queue 112 until after dequeueing the N=5 packets shown in unshaped queue 110.

In some embodiments, sequence circuit 132 associates sequence numbers with the packets, for example as they are ingressed. In these embodiments, scheduler 118 dequeues packets from each shaped queue 112 to egress circuit 126 based on the sequence numbers of the packets in unshaped queue 110 and the sequence numbers of the packets in that shaped queue 112. For example, the sequence numbers can be increasing integers, and scheduler 118 dequeues packets from a shaped queue 112 to egress circuit 126 only when none of the sequence numbers of the packets in shaped queue 112 exceed any of the sequence numbers of the packets in unshaped queue 110.

Figure 8:
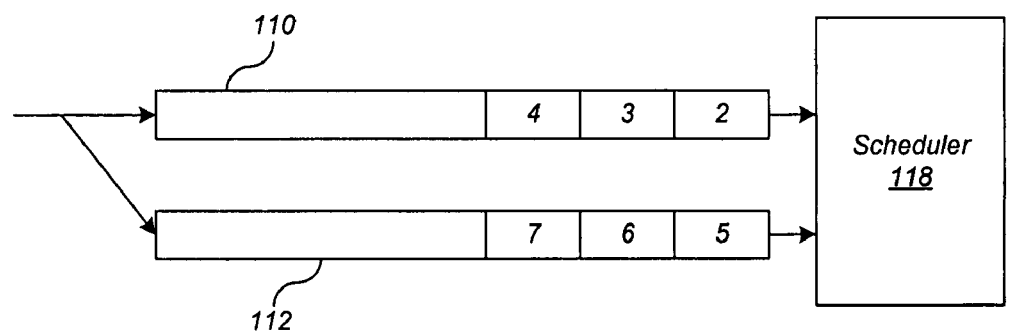
FIG. 8 shows example sequence numbers for packets in a shaped queue and an unshaped queue according to an embodiment.
Figure 7:
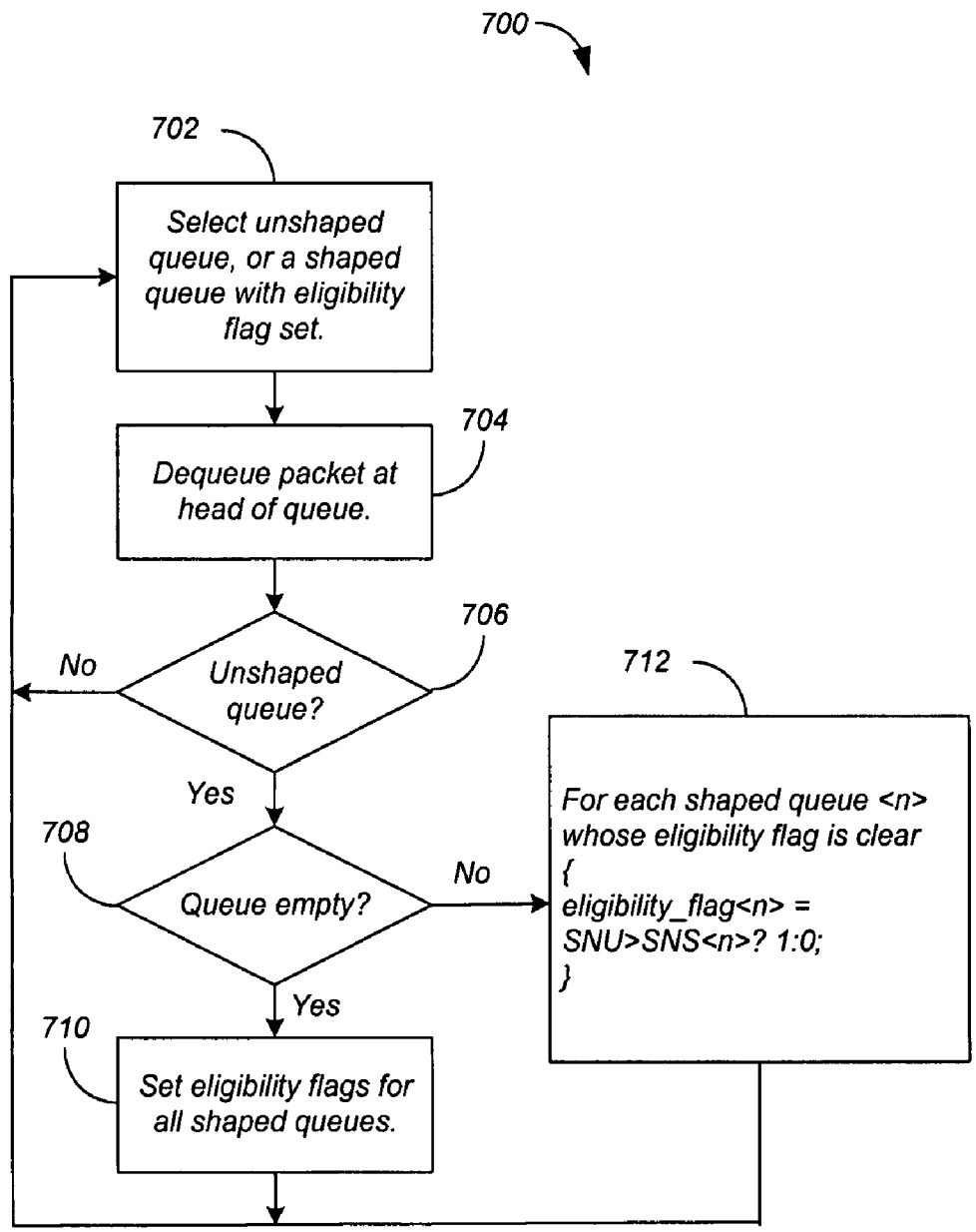
FIG. 7 shows a process for the scheduler of FIG. 1 for dequeueing packets based on sequence numbers according to an embodiment.

FIG. 7 shows a process 700 for scheduler 118 for dequeueing packets based on sequence numbers according to an embodiment. According to process 700, each shaped queue 112 has an eligibility flag. When a shaped queue 112 is created, the eligibility flag for the shaped queue 112 is cleared. Also according to process 700, sequence circuit 132 (FIG. 1) associates increasing sequence numbers with the packets in order of their arrival. FIG. 8 shows example sequence numbers for packets in a shaped queue 110 and an unshaped queue 112 according to an embodiment. Referring to FIG. 8, unshaped queue 112 contains packets associated with sequence numbers 2, 3, and 4, while shaped queue 112 contains packets associated with sequence numbers 5, 6, and 7.

Referring again to FIG. 7, scheduler 118 selects unshaped queue 110, or a shaped queue 112 having an eligibility flag that is set (step 702). Scheduler 118 can employ any suitable technique to select queues 110, 112. Scheduler 118 then dequeues the packet at the head of the selected queue 110, 112 (step 704). If the selected queue is not unshaped queue 110 (step 706), scheduler 118 selects a queue 110, 112 again (returning to step 702). But if the selected queue is unshaped queue 110 (step 706), scheduler 118 determines whether unshaped queue 110 is empty (step 708). If unshaped queue 110 is empty, scheduler 118 sets the eligibility flags for all of the shaped queues 112 (step 710) before selecting another queue 110, 112 (returning to step 702). But if unshaped queue 110 is not empty, for each shaped queue 112 having an eligibility flag that is clear, scheduler 118 compares the sequence number SNS of the packet at the head of the selected shaped queue 112 with the sequence number SNU of the packet at the head of the unshaped queue 110, and if SNU>SNS, sets the eligibility flag (step 712). Process 700 then returns to step 702. In this way, scheduler 118 dequeues packets from each shaped queue 112 only when no packets in the unshaped queue 110 have a sequence-number greater than the sequence number of any packet in the shaped queue 112, thereby ensuring packets in each data flow are transmitted in order.

Embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope. Accordingly, other implementations are within the scope of the following claims.

What is claimed is:

1. An apparatus comprising:
   a first ingress circuit to receive packets of data;
   an egress circuit to transmit the packets;

a second ingress circuit to receive one or more shaping indications each identifying a respective data flow comprising a plurality of the packets;

a shaping controller to associate each data flow with a respective shaped queue in response to the respective shaping indication;

a flow identification engine to identify the packets received by the first ingress circuit that belong to each of the data flows;

a forwarding engine to transfer the packets belonging to each data flow from the first ingress circuit to the associated shaped queue, and to transfer the packets not belonging to any of the data flows from the ingress circuit to an unshaped queue; and a scheduler to dequeue the packets from the unshaped queue to the egress circuit, and to dequeue the packets from each shaped queue to the egress circuit only when no packets for the respective data flow remain in the unshaped queue.

2. The apparatus of claim 1:
wherein the packets are dequeued from each shaped queue according to a respective traffic shaping algorithm.

3. The apparatus of claim 1:
wherein the shaping controller creates one or more of the shaped queues in response to the shaping indications; and
wherein the scheduler dequeues packets from each of the one or more shaped queues only after dequeueing any packets present in the unshaped queue when the respective shaped queue was created.

4. The apparatus of claim 1, further comprising:
a sequence circuit to associate sequence numbers with the packets;
wherein the scheduler dequeues the packets from each shaped queue to the egress circuit based on the sequence numbers of the packets in the unshaped queue and the sequence numbers of the packets in the respective shaped queue.

5. The apparatus of claim 4:
wherein the sequence circuit associates increasing sequence numbers with the packets in arrival order; and
wherein the scheduler dequeues packets from each shaped queue only when no packets in the unshaped queue have a sequence number greater than the sequence number of any packet in the shaped queue.

6. The apparatus of claim 1:
wherein each shaping indication represents congestion of a transmission path of the respective data flow.

7. The apparatus of claim 6, wherein the shaping indications comprise at least one of:
backward congestion notification (BCN) packets;
quantized congestion notification (QCN) packets;
endpoint congestion management (ECM) packets; and
quantized endpoint congestion management (QECM) packets.

8. The apparatus of claim 6:
wherein each shaping indication includes at least a portion of one of the packets of data belonging to the respective data flow.

9. A network device comprising the apparatus of claim 1.

10. The network device of claim 9, wherein the network device is selected from the group consisting of:
a network switch;
a network bridge;
a router; and
a network interface card.

11. The apparatus of claim 1, wherein the apparatus is compliant with IEEE standard 802.1.Qau, including draft and approved amendments.

12. A method of operating a network device, the method comprising:
receiving packets of data at the network device;
receiving one or more shaping indications each identifying a respective data flow comprising a plurality of the packets;
associating each data flow with a respective shaped queue in response to the respective shaping indication;
identifying the received packets that belong to each of the data flows;
transferring the packets belonging to each data flow to the associated shaped queue;
transferring the packets not belonging to any of the data flows to an unshaped queue;
transmitting, from the network device, the packets from the unshaped queue; and
transmitting, from the network device, the packets from each shaped queue only when no packets for the respective data flow remain in the unshaped queue.

13. The method of claim 12:
wherein the packets are transmitted from each shaped queue according to a respective traffic shaping algorithm.

14. The method of claim 12, further comprising:
creating one or more of the shaped queues in response to the shaping indications; and
transmitting the packets from each shaped queue only after transmitting any packets present in the unshaped queue when the shaped queue was created.

15. The method of claim 12, further comprising:
associating sequence numbers with the packets; and
transmitting the packets from each shaped queue based on the sequence numbers of the packets in the unshaped queue and the sequence numbers of the packets in the respective shaped queue.

16. The method of claim 15:
wherein increasing sequence numbers are associated with the packets in arrival order; and
wherein the packets are transmitted from each shaped queue only when no packets in the unshaped queue have a sequence number greater than the sequence number of any packet in the shaped queue.

17. The method of claim 12:
wherein each shaping indication represents congestion of a transmission path of the respective data flow.

18. The method of claim 17, wherein the shaping indications comprise at least one of:
backward congestion notification (BCN) packets;
quantized congestion notification (QCN) packets;
endpoint congestion management (ECM) packets; and
quantized endpoint congestion management (QECM) packets.

19. The method of claim 17:
wherein each shaping indication includes at least a portion of one of the packets of data belonging to the respective data flow.

20. The method of claim 12, wherein the method is compliant with IEEE standard 802.1.Qau, including draft and approved amendments.

* * * * *